United States Patent [19]

Reichl et al.

[11] 4,428,519

[45] Jan. 31, 1984

[54] DEVICE FOR TENSIONING A DATA CARRIER WHICH IS MOVED BY FEED TRACTORS

[75] Inventors: Helmut Reichl, Fuerstenfeldbruck; Richard Hartl, Germering; Christoph Newinger, Munich, all of Fed. Rep. of Germany

[73] Assignee: Siemens Aktiengesellschaft, Berlin & Munich, Fed. Rep. of Germany

[21] Appl. No.: 396,020

[22] Filed: Jul. 7, 1982

[30] Foreign Application Priority Data

Jul. 14, 1981 [DE] Fed. Rep. of Germany ....... 3127777

[51] Int. Cl.³ ........................ B65H 17/38; G03B 1/30

[52] U.S. Cl. ....................................... 226/75; 226/170

[58] Field of Search ................... 226/6, 25, 52, 74, 75, 226/170–172; 271/34, 35; 400/616, 616.1, 616.2

[56] References Cited

U.S. PATENT DOCUMENTS

| | | | |
|---|---|---|---|
| 3,859,864 | 1/1975 | Offermann | 226/74 |
| 4,213,551 | 8/1980 | Windele | 226/74 |
| 4,345,708 | 8/1982 | Hubbard | 226/74 |

*Primary Examiner*—Leonard D. Christian

*Attorney, Agent, or Firm*—Hill, Van Santen, Steadman & Simpson

[57] ABSTRACT

A device for tensioning a data carrier which is moved by feed tractors, such as a paper sheet moving past a printing station in a non-mechanical printer or copier in which the feed tractors consist of a toothed belt entrained about pairs of wheels, the teeth of the belt engaging perforations in the side margins of the data carrier, has a cam mounted on a shaft between the wheels in a feed tractor. The wheels are mounted on a guide block having a bearing element which acts as a cam follower so that by rotating the cam the wheels are synchronously displaced so as to suitably tension the data carrier in the printing station.

6 Claims, 2 Drawing Figures

DEVICE FOR TENSIONING A DATA CARRIER WHICH IS MOVED BY FEED TRACTORS

BACKGROUND OF THE INVENTION

1. Field of the Invention

The present invention relates to devices for tensioning a data carrier which is moved by means of feed tractors and which traverses a curved zone between the feed tractors, and in particular to such a device for tensioning a paper sheet in a high speed non-mechanical printer or copier.

2. Description of the Prior Art

A transportation device for conveying a data carrier, such as a paper web in the transfer station of a non-mechanical printer or copier, is disclosed in German OS No. 2,717,315, corresponding to U.S. Pat. No. 4,213,551. The paper web has equidistantly spaced peripheral perforations at its side margins and the transportation device includes feed tractors disposed preceding and following the transfer station about which an endless toothed belt is entrained which engages the perforations and conveys the paper. The feed tractors operate in pairs, with pairs of feed tractors being arranged at the opposite margins of the paper web.

That portion of the data carrier which is disposed between the feed tractors and moves past the transfer station or printing station must be uniformly tensioned in order to achieve accurate image transfer or printing. Factors which operate to introduce nonuniformity into the tensioning of the paper web in the transfer station are: tolerances in the position of the transportation perforations on the data carrier relative to one another as a result of production tolerances, temperature, moisture, and the fact that the data carrier is moved over a curved path in the transfer station thus changing the effective distance between the transportation perforations due to differing thicknesses of data carriers. Such differing thicknesses may be the result of non-uniformities in the thickness of a single-layer data carrier, or by virtue of the use of a multi-layer data carrier.

It is an object of the present invention to provide a device for tensioning a data carrier which is moved by means of feed tractors in which the position of the feed tractors can be matched to different thicknesses of data carriers and the tensioning of the data carrier can be correspondingly modified.

It is a further object of the present invention to provide such a tensioning device which can be utilized when the data carrier traverses a curved zone between the feed tractors in the transfer station of a non-mechanical printer or copier.

The above object is inventively achieved in a tensioning device including a shaft-mounted cam disposed between the wheels of at least one of the feed tractors and which abuts against a bearing element associated with at least one of the wheels in the feed tractor. The wheel associated with the bearing element against which the cam abuts is mounted on a block which is in turn mounted on guide rails which are parallel to the direction of transportation of the data carrier so that by rotating the cam the wheel of the feed tractor is displaced in the direction of transportation of the data carrier thereby adjusting the tension of the data carrier between the adjustable feed tractor and another feed tractor on the same side of the data carrier. The other feed tractor remains in its existing position.

The feed tractor may be constructed in a known manner including two wheels with a transportation belt entrained about the wheels with the shaft having the cam mounted thereon disposed between the two wheels. The cam preferably acts upon a bearing component which is associated with the wheel in the feed tractor which is closest to the curved zone traversed by the data carrier, namely the transfer station.

If a common belt is entrained about the wheels of two feed tractors which are respectively disposed preceding and following the transfer station, rather than two separate belts respectively entrained about each feed tractor, a change in the position of the wheels of the first tractor requires a readjustment of the belt tension in order to tension the data carrier. In this case is preferable to include a further bearing element associated with the other wheel of the first feed tractor, which further bearing component also abuts the cam. The cam is shaped such that upon rotation of the cam the wheels in the first feed tractor are displaced along the guide rails by different amounts.

Each wheel of the first feed tractor may be mounted on a guide block on which the bearing element is also mounted with the guide blocks being slidable along the guide rails in the direction of transportation of the data carrier.

In order to coarsely adjust the position of the bearing elements within the guide blocks, the bearing element is preferably received in a slot in the guide block at a side thereof adjacent to the cam so that the guide block can be set at a position within the slot which permits displacement of the wheels of the feed tractor in a desired range by subsequently rotating the cam.

Identical tensioning devices are embodied in feed tractors comprising a feed tractor pair disposed at the opposite margins of the data carrier. One of the tractors in the tractor pair may be laterally displaceable along axles which are perpendicular to the direction of data carrier transportation so that data carriers of different widths can be accommodated by sliding the feed tractor and tensioning device along the axles until the desired width is obtained.

This device permits adjustment of the tension of the data carrier in the transfer station even when data carriers of different thicknesses are utilized.

DESCRIPTION OF THE PREFERRED EMBODIMENTS

Figure 1:
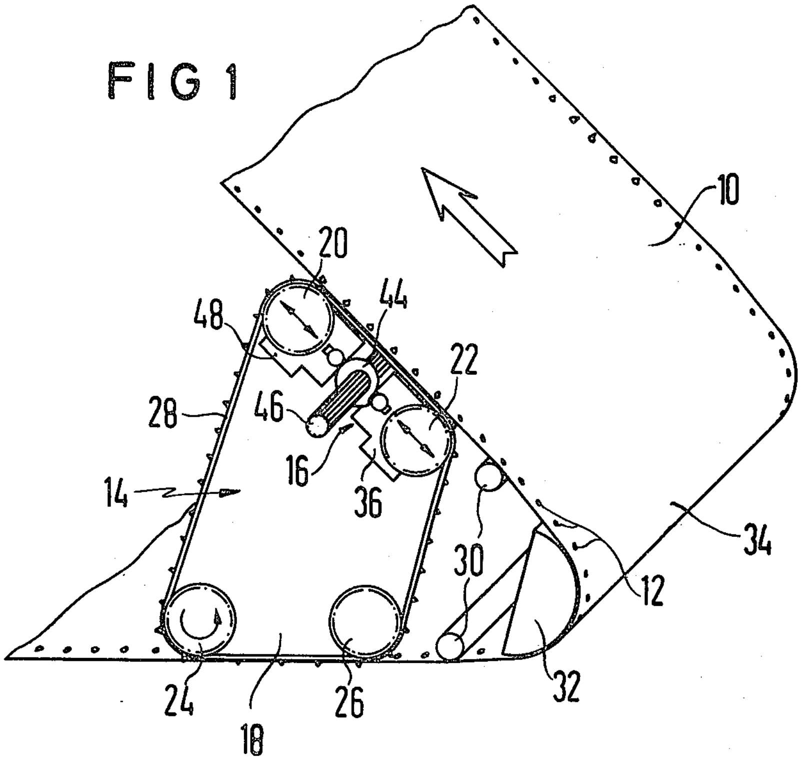
FIG. 1 is a perspective view of a data carrier transportation device embodying a data carrier tensioning device constructed in accordance with the principles of the present invention.

A transporting device 14 and a tensioning device 16 constructed in accordance with the principles of the present invention for respectively transporting and tensioning a data carrier 10, such as a paper web, in the transfer or printing station of a high speed non-mechanical copier or printer is shown in FIG. 1. The transfer station (or printing station) forms no part of the present invention and is not shown in FIG. 1. The data carrier 10 has equidistantly spaced peripheral perforations 12 at the side margins thereof.

The transportation device 14 for the data carrier 10 consists of a first pair 16 of feed tractors and a second pair 18 of feed tractors. Only one feed tractor in each pair 16 and 18 can be seen in FIG. 1, however, it will be understood that identical feed tractors are disposed at the opposite side of the data carrier 10.

The feed tractor 16 consists of wheels 20 and 22 and the feed tractor 18 consists of wheels 24 and 26. In the embodiment of FIG. 1 all four wheels of the two feed tractors are entrained by an endless toothed tranportation belt 28, however, it will be understood to those skilled in the art that a separate transportation belt may be employed for each feed tractor.

The data carrier 10 is conducted through the printing station in a curved zone 34 with the aid of guide bars 30 and a curved bearing surface 32. Image transfer such as from a rotating photoconductor drum to the data carrier 10 takes place in the curved zone 34. The curved zone 34 of the data carrier 10 is disposed between the first pair of feed tractors 16 and the second pair of feed tractors 18.

The transportation belt 28 has a plurality of spaced teeth on its exterior which engage the perforations 12 of the data carrier 10 for transporting the data carrier 10. The feed tractors must be disposed such that the teeth of the transportation belt 28 engage in registry with the transportation perforations 12, and in addition the data carrier 10 must be uniformly tensioned in the curved zone 34. Moreover, it must be assured that such uniform tension can be maintained even when different data carriers 10 of different thicknesses or multi-layer data carriers 10 are utilized. In order to adjust and maintain the tension of the data carrier 10, one of the pairs of feed tractors 16 or 18 is in accordance with the principles of the present invention augmented with a device for displacing one or both of the wheels thereby adjusting the tension of the data carrier 10 in the curved zone 34. In the embodiment shown in FIG. 1 the tractor pair 16 is augmented in this manner.

As the wheel 22 which forms a part of the visible feed tractor in the feed tractor pair 16 and which is the wheel closest to the curved zone 34, is moved parallel to the direction of transportation of the data carrier 10, as indicated by the arrows, the tension of the data carrier 10 in the curved zone 34 is changed. Moreover, the other wheel 20 of the visible feed tractor in the feed tractor pair 16 must be synchronously adjusted with the wheel 22 in order to maintain the necessary belt tension of the transportation belt 28.

Figure 2:
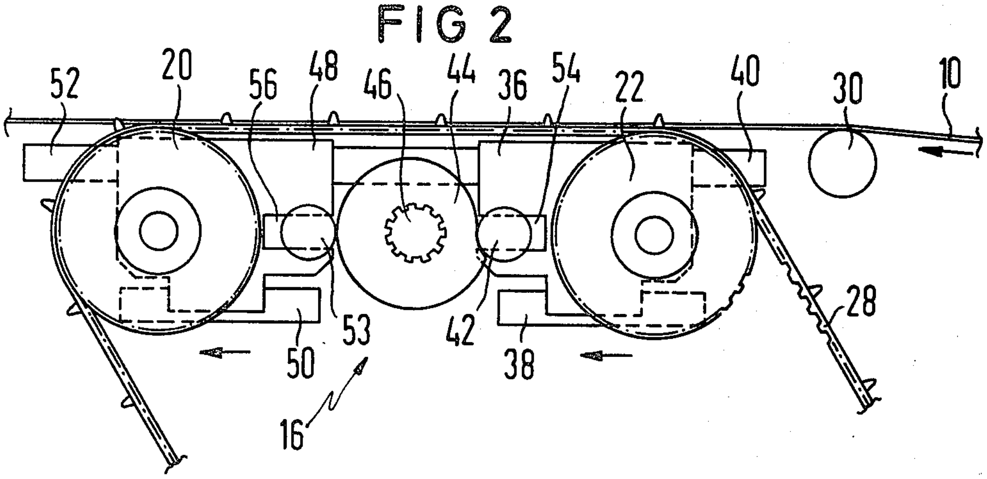
FIG. 2 is an enlarged side view of one feed tractor of the device shown in FIG. 1.

The details of the present invention are shown in FIG. 2 which shows the reel 22 which is closest to the curved zone 34 of the data carrier 10 rotatably mounted in a guide block 36. The guide block 36 is displaceably mounted on two guide rails 38 and 40 which are disposed parallel to the direction of transportation of the data carrier 10. A bearing element 42 is also secured in the guide block 36 at a side of the guide block 36 for coming into contact with a cam 44 which is mounted on a splined shaft 46.

As a result of rotation of the shaft 46 and the cam 44, a force is exerted on the bearing element 42 and thus upon the guide block 36 so that the guide block 36 is displaced along the guide rails 38 and 40. As a result the wheel 22 is correspondingly displaced. The amount of displacement of the wheel 22 is determined by suitable selection of the shape of the cam 44.

As stated above, the other wheel 20 must be synchronously displaced with the wheel 22. If, as in the embodiment shown in FIG. 1, a single transportation belt 28 is used for both of the feed tractors on the same side of the data carrier 10, the wheel 20 cannot be displaced by the same amount as the wheel 22 if the belt tension is to be maintained. In order to be able to adjust the wheel 20 by a different amount with respect to the wheel 22 of the same feed tractor, the wheel 20 is also mounted on a guide block 48 which is in turn mounted on guide rails 50 and 52 which are also parallel to the direction of transportation of the data carrier 10. The guide block 48 also has mounted therein a bearing element 53 which also is in contact with the cam 44 on a side thereof opposite to the guide block 36. By means of appropriate shaping of the cam 44 the guide block 36 and the guide block 48, and therefore the wheels 22 and 20 will be displaced by different amounts upon rotation of the cam 44. By this tensioning means it is therefore possible to maintain the data carrier in a uniformly tensioned state and also to maintain the belt tension of the transportation belt 28.

In order to adjust the tension of the data carrier 10 and the belt tension of the transportation belt 28, only one feed tractor pair is adjusted, namely the feed tractor pair 16, while the other pair 18 remains stationary.

If a pair of feed tractors is utilized to transport the data carrier 10, the other feed tractor at the opposite side of the data carrier 10, which cannot be seen in FIG. 1, will be identically constructed, with the splined shaft 46 extending across the width of the data carrier 10 to effect identical adjustment, by means of identical rotation of the cam 44 and its non-visible counterpart on the opposite side of the data carrier 10, of the two feed tractors in the pair 16. In order to accommodate data carriers 10 of different widths, one of the feed tractors in the pairs 16 and 18 may be displaceable along a lateral axis perpendicular to the direction of transportation of the data carrier 10.

In order to permit coarse adjustment of the amount of displacement of the wheels 20 and 22 of the first feed tractor, the bearing elements 42 and 53 may be mounted in respective slots 54 and 56 in the respective guide blocks 36 and 48. The bearing elements 42 and 53 can thus be inserted a distance in the slots 54 and 56 so as to achieve the necessary amount of displacement when the cam 44 is rotated.

Although modifications and changes may be suggested by those skilled in the art it is the intention of the inventors to embody within the patent warranted hereon all changes and modifications as reasonably and properly come within the scope of their contribution to the art.

We claim as our invention:

1. In a device for transporting a sheet data carrier having first and second feed tractors, said data carrier being transported through a curved zone disposed between said first and second feed tractors, the improvement of a means for uniformly tensioning said data carrier in said curved zone comprising:

guide rails disposed parallel to the direction of transport of said data carrier on which at least one of said feed tractors is displaceably mounted;

a bearing element connected to said feed tractor which is mounted on said guide rails; and a cam mounted on a rotatable shaft and abutting said bearing element such that said feed tractor which is mounted on said guide rails is displaced in a direction parallel to the direction of transport of said data carrier upon rotation of said cam and shaft thereby adjusting the tension of said data carrier in said curved zone.

2. The improvement of claim 1 wherein said feed tractor which is mounted on said guide rails consists of two spaced wheels and wherein said device further has a transportation belt entrained about said first and second feed tractors and wherein said bearing component is connected to a wheel in said feed tractor which is mounted on said guide rails which is closer to said curved zone, and wherein said means for uniformly tensioning said data carrier further comprises a means for synchronously moving said two wheels in said feed tractor which is mounted on said guide rails upon rotation of said cam.

3. The improvement of claim 2 wherein said means for synchronously moving said two wheels comprises a further bearing element abutting said cam connected to the other wheel in said feed tractor which is mounted on said guide rails, and wherein said cam is shaped such that said wheels are displaced by different amounts upon rotation of said cam.

4. The improvement of claim 2 wherein said means for synchronously moving said wheels comprises:

a pair of guide blocks on which said wheels are respectively mounted, said guide blocks being displaceably mounted on said guide rails, one of said guide blocks for the wheel which is closer to said curved zone having said bearing element mounted therein; and a further bearing element mounted in the other of said guide blocks, said cam being disposed between said guide blocks and abutting said bearing element and said further bearing element.

5. The improvemefurther bearing element are respectively mounted such that the position of said bearing element and said further bearing element in said slots in said guide blocks can be adjusted for adjusting the amount of displacement of said wheels.

6. The improvement of claim 1 wherein each of said first and second feed tractors consists of a pair of tractor means disposed at opposite sides of said data carrier and at least one of said tractor means in each pair of feed tractors being displaceable along the width of said data carrier for accommodating data carriers of different widths, and wherein said cam is axially displaceably mounted on said rotatable shaft for displacement along the width of said data carrier with one of said tractor means.

* * * * *